US012657048B2

(12) United States Patent
Van Schaik et al.

(10) Patent No.: US 12,657,048 B2
(45) Date of Patent: Jun. 16, 2026

(54) ARBITRARY DESTINATION CALLBACK INVOCATION BETWEEN A TRUSTED EXECUTION ENVIRONMENT AND A VIRTUAL MACHINE

(71) Applicant: QUALCOMM Incorporated, San Diego, CA (US)

(72) Inventors: Carl Frans Van Schaik, Botany (AU); Christian Bolis, San Diego, CA (US); James Scott Anderson, San Diego, CA (US); Nicolas Andreas Beier, San Diego, CA (US); Nicholas Brandon Pelham, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 18/185,296

(22) Filed: Mar. 16, 2023

(65) Prior Publication Data

US 2024/0311171 A1      Sep. 19, 2024

(51) Int. Cl.
G06F 9/455        (2018.01)

(52) U.S. Cl.
CPC .................... G06F 9/45558 (2013.01); G06F 2009/45575 (2013.01); G06F 2009/45587 (2013.01)

(58) Field of Classification Search
None
See application file for complete search history.

(56) References Cited

U.S. PATENT DOCUMENTS

| | | | | |
|---|---|---|---|---|
| 9,292,712 B2 * | 3/2016 | Ståhl | ..................... | G06F 21/725 |
| 9,716,710 B2 * | 7/2017 | Vij | ..................... | H04L 63/0823 |
| 11,436,318 B2 * | 9/2022 | Li | ..................... | G06F 9/45558 |
| 11,726,807 B2 * | 8/2023 | Amit | ..................... | G06F 21/53 |
| | | | | 718/1 |

(Continued)

FOREIGN PATENT DOCUMENTS

| | | |
|---|---|---|
| EP | 1285354 B1 | 3/2004 |
| JP | 2020536321 A | 12/2020 |
| WO | 2021252141 A1 | 12/2021 |

OTHER PUBLICATIONS

Coulouris G., et al., "Distributed Systems: Concepts and Design (5th Edition)", May 7, 2011, Addison-Wesley, US, XP055319910, pp. 223, 299, 696 Pages.

(Continued)

*Primary Examiner* — Hiren P Patel
(74) *Attorney, Agent, or Firm* — Polsinelli LLP

(57)        ABSTRACT
Systems and techniques are provided for providing access to one or more execution environments. For example, a process can include receiving a listen call from a first virtual machine (VM) and registering a listener call context of the first VM with a callback service of a trusted execution environment (TEE). A return code indicating no callback requests are available causes the first VM to put the listener call context to sleep. A call from a second VM raises a service request for a VM service of the first VM. A wake return code to the second VM wakes the listener call context of the first VM. A callback request transmitted to the VM service of the first VM corresponds to the service request raised by the second VM. A response call received from the VM service of the first VM is indicative of a callback response to the callback request.

30 Claims, 7 Drawing Sheets

(56)  References Cited

U.S. PATENT DOCUMENTS

| | | | | |
|---|---|---|---|---|
| 2008/0244569 A1* | 10/2008 | Challener | ........... | G06F 9/45558 |
| | | | | 718/1 |
| 2016/0080320 A1* | 3/2016 | Barakat | ................... | H04L 63/00 |
| | | | | 726/4 |
| 2019/0042339 A1 | 2/2019 | Doshi et al. | | |
| 2021/0311643 A1* | 10/2021 | Shanbhogue | ......... | G06F 3/0622 |
| 2021/0389953 A1* | 12/2021 | Sharma | ................. | G06F 9/4812 |
| 2024/0338255 A1* | 10/2024 | Zhang | ................... | G06F 9/5077 |
| 2025/0208894 A1* | 6/2025 | Mai | ....................... | G06F 9/4856 |

OTHER PUBLICATIONS

International Search Report and Written Opinion—PCT/US2024/018660—ISA/EPO—Jul. 31, 2024.
Wang J., et al., "XenLoop: A Transparent High Performance Inter-VM Network Loopback", Proceedings of the 17th International Symposium on High Performance Distributed Computing, HPDC '08, ACM Press, New York, USA, Jun. 23, 2008, pp. 109-118, XP058345182, Sections 1, 2, 3.1, 3.2, 3.3, Figure 2.
Wang J., "Survey of State-of-the-art in Inter-VM Communication Mechanisms", Research Proficiency Report, 2009, Sep. 27, 2009, pp. 1-25, XP055090654, cs.binghamton.edu, 1, 2, 3.1, 3.2, 3.3, 3.6.
Wang R., et al., "Efficient Asynchronous Communication between Virtual Machines in Embedded Systems", 2017 IEEE 19TH International Conference on High Performance Computing and Communications, IEEE 15th International Conference on Smart City, IEEE 3rd International Conference on Data Science and Systems (Hpcc/Smartcity/ Dss), Dec. 1, 2017, pp. 603-604, XP093171688, p. 2, Figure 1.

* cited by examiner

100b

| | | Least Privilege |
|---|---|---|
| EL-0 130 | Application/ User Space | |
| EL-1 132 | Kernel Kernel Drivers VMs | |
| EL-2 134 | Hypervisor | |
| EL-3 136 | Secure Monitor | |
| | | Most Privilege |

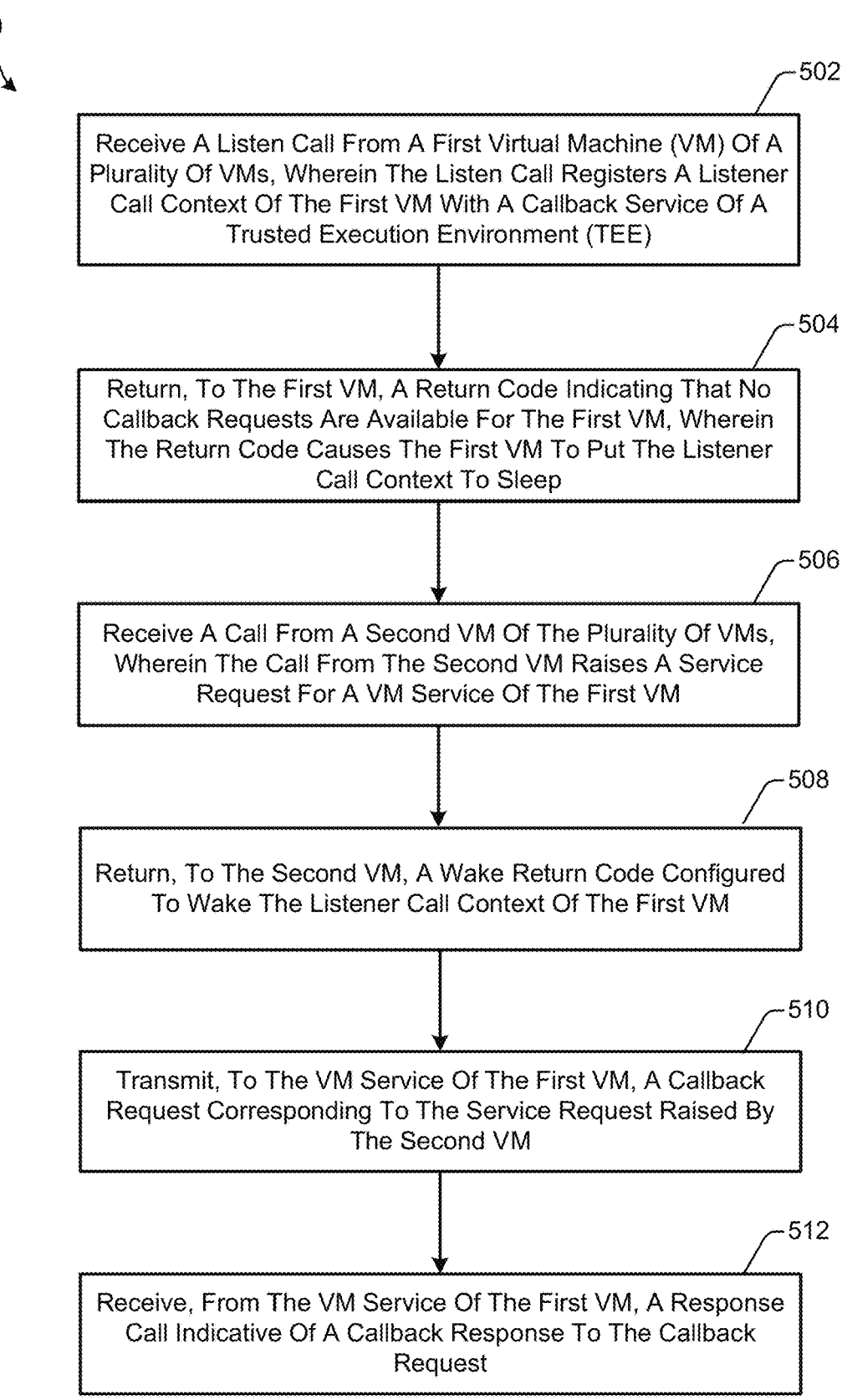

500

502
Receive A Listen Call From A First Virtual Machine (VM) Of A Plurality Of VMs, Wherein The Listen Call Registers A Listener Call Context Of The First VM With A Callback Service Of A Trusted Execution Environment (TEE)

504
Return, To The First VM, A Return Code Indicating That No Callback Requests Are Available For The First VM, Wherein The Return Code Causes The First VM To Put The Listener Call Context To Sleep 506
Receive A Call From A Second VM Of The Plurality Of VMs, Wherein The Call From The Second VM Raises A Service Request For A VM Service Of The First VM 508
Return, To The Second VM, A Wake Return Code Configured To Wake The Listener Call Context Of The First VM 510
Transmit, To The VM Service Of The First VM, A Callback Request Corresponding To The Service Request Raised By The Second VM 512
Receive, From The VM Service Of The First VM, A Response Call Indicative Of A Callback Response To The Callback Request

FIG. 5

ARBITRARY DESTINATION CALLBACK INVOCATION BETWEEN A TRUSTED EXECUTION ENVIRONMENT AND A VIRTUAL MACHINE

FIELD OF THE DISCLOSURE

The present disclosure generally relates to security protocols and devices. For example, aspects of the present disclosure relate to arbitrary destination callback invocation between a trusted execution environment and a virtual machine.

BACKGROUND OF THE DISCLOSURE

Modern software systems are often split into multiple modules/components that each have a different level of privilege or access to the computing device's resources (e.g., system resources, processor resources, memory resources, etc.). An example of such a split is between the operating system (OS) kernel and user applications in which the user applications are given a much more limited level of access to system resources than the OS kernel.

To facilitate similar splits at the chip level, certain processors and computing architectures (e.g., ARM, RISC-V, Hexagon DSP, etc.) include features that support hierarchical protection domains and/or implement different levels of privilege. Such systems typically only operate at one level of privilege at a time, and the level of privilege ("current privilege level") may only be changed when the device processor takes or returns from an exception. For this reason, the privilege levels are commonly called exception levels (ELs). These exception levels may be numbered (e.g., EL-0 to EL-3) so that the higher levels of privilege have higher numbers. For example, software with the lowest levels of privilege (e.g., user applications, etc.) may operate at EL-0, whereas software with the highest levels of privilege (the system monitor, etc.) may operate at EL-3.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for providing secure access in a Trusted Execution Environment (TEE). According to at least one illustrative example, a method of providing access to one or more execution environments is provided. The method includes: receiving a listen call from a first virtual machine (VM) of a plurality of VMs, wherein the listen call registers a listener call context of the first VM with a callback service of a trusted execution environment (TEE); returning, to the first VM, a return code indicating that no callback requests are available for the first VM, wherein the return code causes the first VM to put the listener call context to sleep; receiving a call from a second VM of the plurality of VMs, wherein the call from the second VM raises a service request for a VM service of the first VM;

returning, to the second VM, a wake return code configured to wake the listener call context of the first VM; transmitting, to the VM service of the first VM, a callback request corresponding to the service request raised by the second VM; and receiving, from the VM service of the first VM, a response call indicative of a callback response to the callback request.

In another illustrative example, an apparatus is provided for providing access to one or more execution environments. The apparatus includes at least one memory and at least one processor coupled to the at least one memory and configured to: receive a listen call from a first virtual machine (VM) of a plurality of VMs, wherein the listen call registers a listener call context of the first VM with a callback service of a trusted execution environment (TEE); return, to the first VM, a return code indicating that no callback requests are available for the first VM, wherein the return code causes the first VM to put the listener call context to sleep; receive a call from a second VM of the plurality of VMs, wherein the call from the second VM raises a service request for a VM service of the first VM; return, to the second VM, a wake return code configured to wake the listener call context of the first VM; transmit, to the VM service of the first VM, a callback request corresponding to the service request raised by the second VM; and receive, from the VM service of the first VM, a response call indicative of a callback response to the callback request.

In another illustrative example, a non-transitory computer-readable storage medium comprising instructions stored thereon which, when executed by at least one processor, causes the at least one processor to: receive a listen call from a first virtual machine (VM) of a plurality of VMs, wherein the listen call registers a listener call context of the first VM with a callback service of a trusted execution environment (TEE); return, to the first VM, a return code indicating that no callback requests are available for the first VM, wherein the return code causes the first VM to put the listener call context to sleep; receive a call from a second VM of the plurality of VMs, wherein the call from the second VM raises a service request for a VM service of the first VM; return, to the second VM, a wake return code configured to wake the listener call context of the first VM; transmit, to the VM service of the first VM, a callback request corresponding to the service request raised by the second VM; and receive, from the VM service of the first VM, a response call indicative of a callback response to the callback request.

In another illustrative example, an apparatus is provided for providing access to one or more execution environments. The apparatus includes: means for receiving a listen call from a first virtual machine (VM) of a plurality of VMs, wherein the listen call registers a listener call context of the first VM with a callback service of a trusted execution environment (TEE); means for returning, to the first VM, a return code indicating that no callback requests are available for the first VM, wherein the return code causes the first VM to put the listener call context to sleep; means for receiving a call from a second VM of the plurality of VMs, wherein the call from the second VM raises a service request for a VM service of the first VM; means for returning, to the second VM, a wake return code configured to wake the listener call context of the first VM; means for transmitting, to the VM service of the first VM, a callback request corresponding to the service request raised by the second VM; and means for receiving, from the VM service of the first VM, a response call indicative of a callback response to the callback request.

Aspects generally include a method, apparatus, system, computer program product, non-transitory computer-readable medium, user device, user equipment, wireless communication device, and/or processing system as substantially described with reference to and as illustrated by the drawings and specification.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

The accompanying drawings are presented to aid in the description of various aspects of the disclosure and are provided solely for illustration of the aspects and not limitation thereof. So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a flow chart illustrating an example of a process for providing secure data access, in accordance with some examples.

DETAILED DESCRIPTION

Figure 1A:
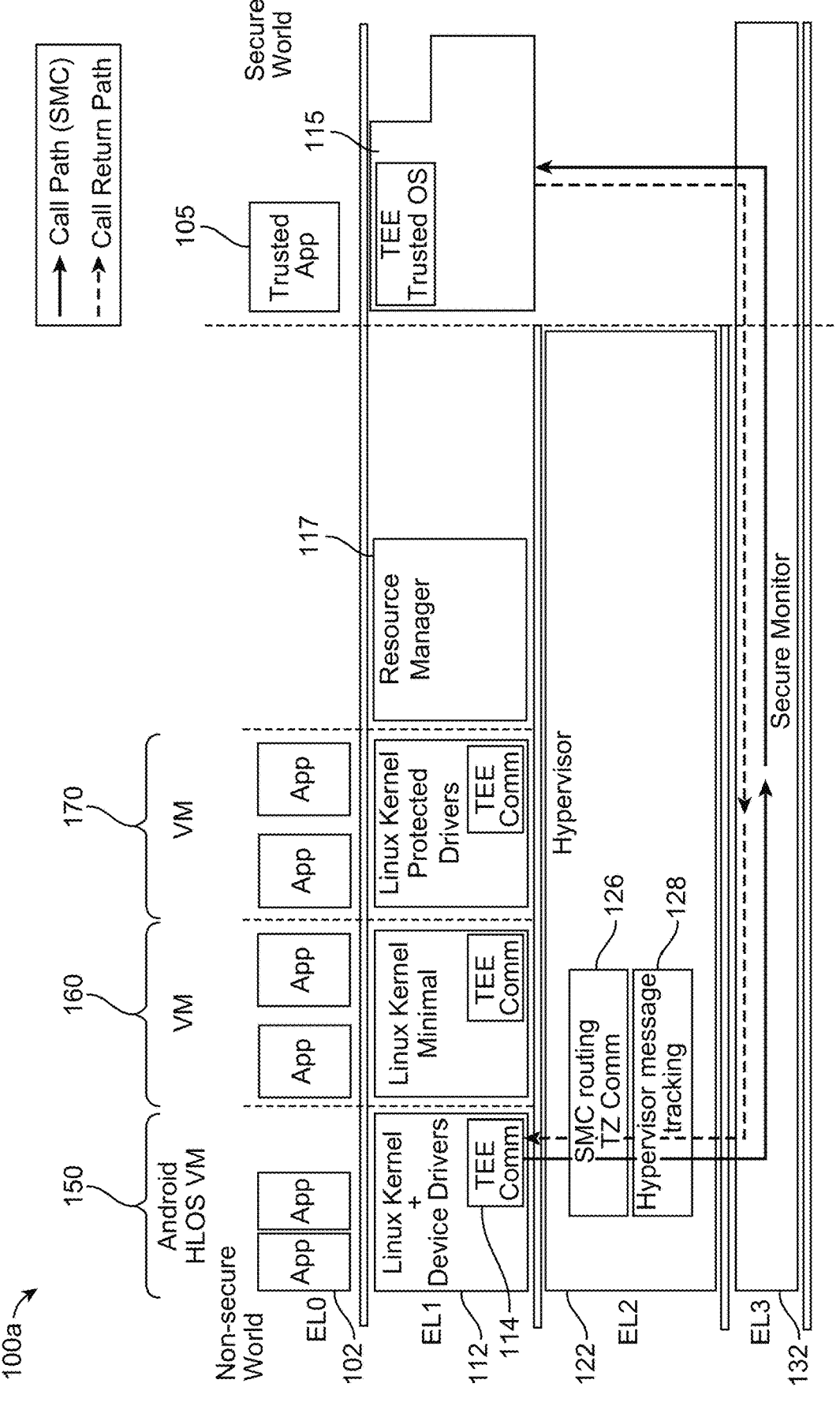
FIGS. 1A and 1B is a block diagram illustrating an example of privileges or exception levels (ELs) in an example computing device, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

The term "computing device" is used herein to refer to any of a variety of computing devices including smartphones, wireless or mobile computing devices (e.g., tablets, laptops, wearable devices, etc.), cellular-based wireless hotspots, IoT devices, eMTC devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

The term "monitor" is used herein to refer to any hardware or software component that may support virtualization technology and/or enables the abstraction (or virtualization) of computing resources, and which operates across execution environments (e.g., across a non-secure or rich/normal execution environment and a trusted/secure execution environment, etc.). This is used herein as the highest privilege level execution environment. A monitor may include any one or all of hardware monitors, specialized hardware fabricated on the chip, virtual machine monitors (VMMs), monitor software running outside of a high level operation system (HLOS), and software monitors running as part of device drivers, which may be outside the HLOS, its memory management systems, and/or its allocator functions. In some aspects, an example of a monitor is a "secure monitor," which refers to software that is designed to securely transition a processor between different security states of the processor (e.g., when supported such as in ARM processors with TrustZone technology) in order to separate the software running at lower privilege levels.

The term "hypervisor" is used herein to refer to any hardware or software component that supports virtualization technology and/or enables the abstraction (or virtualization) of computing resources, and which operates within an execution environment (e.g., within the rich/normal execution environment, etc.). A hypervisor may create and operate virtual machines (VMs) and/or host multiple operating systems (called guest operating systems) and may act as Virtual Machine Manager. The hypervisor presents the guest operating systems with a virtual operating platform and manages the execution of the guest operating systems. Each guest operating system may interact with the virtual operating platform as if it was operating on the physical hardware. This allows each guest operating system to operate under the illusion of having exclusive access to the processors, peripherals, memory and I/O of the computing system.

Figure 1B:
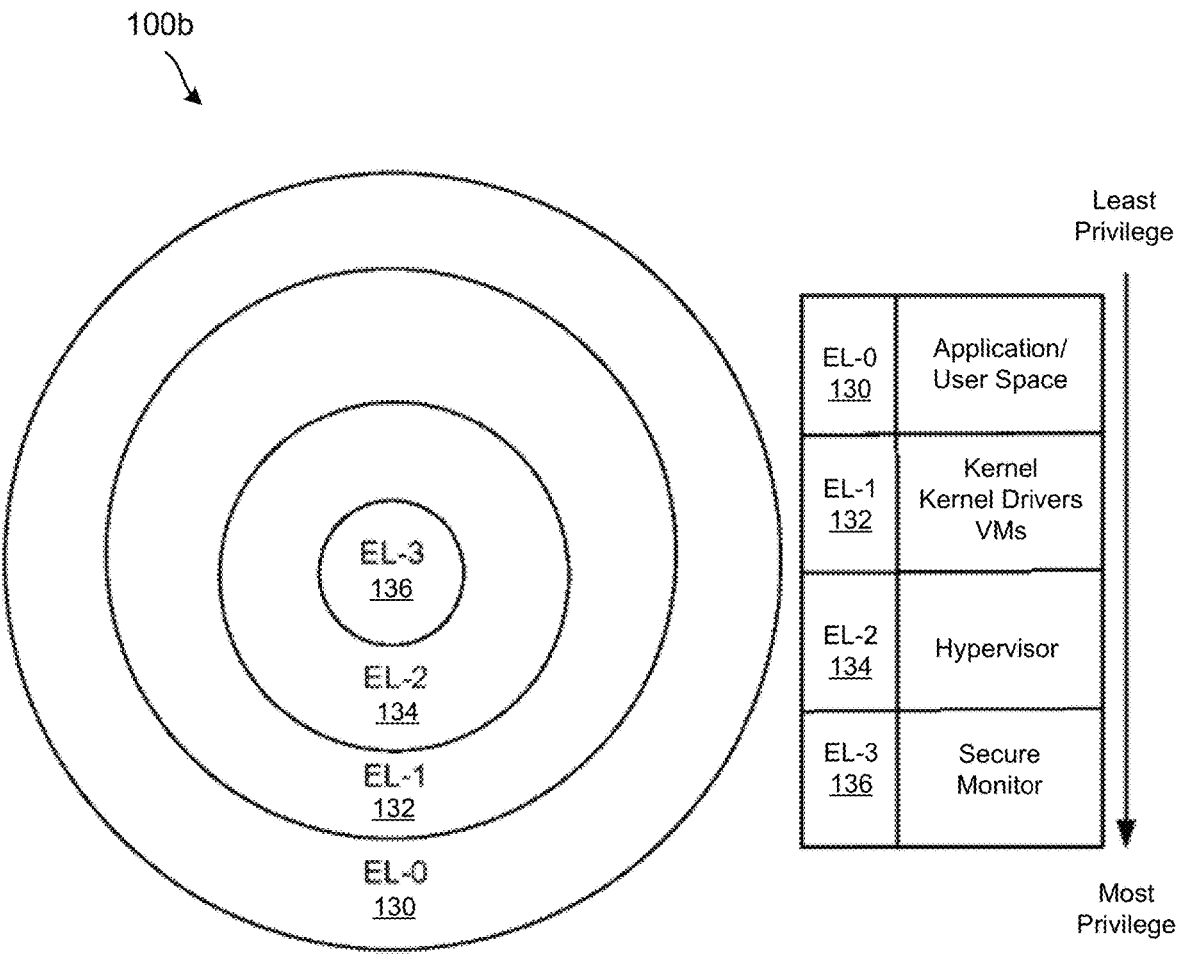

FIGS. 1A and 1B are block diagrams illustrating examples of privileges or exception levels (ELs) that can be implemented in an example computing system 100*a* having a Reduced Instruction Set Computer (RISC) architecture (e.g., ARM, RISC-V, etc.). For example, components in the computing system 100*a* may be configured to execute within various exception levels (EL) that control execution privileges to the components executing within each respective EL. In one illustrative example, the exception levels can include a first exception level EL-0, a second exception level EL-1, a third exception level EL-2, and a fourth exception level EL-3.

Each exception level can be associated with different components of the computing system 100*a*, with the components of a given EL having respective execution privileges corresponding to the given EL. For instance, EL-0 may control a first set of execution privileges to the components executing within EL-0; EL-1 may control a second set of execution privileges to the components executing within EL-1; etc.

In some aspects, the first exception level EL-0 can be associated with a lowest level of execution privileges and may also be referred to as the lowest privilege level. Execution at EL-0 is unprivileged execution. Increased exception level values (e.g., from 1 to 3) can correspond to increase levels of execution privileges. For example, the fourth exception level EL-3 can be associated with a highest level of execution privileges. Different exception levels can provide support for different functionalities. For instance, in the ARM architecture, EL-2 can provide support for processor virtualization via a hypervisor (e.g., such as the hypervisor 122 depicted in EL-2 of FIG. 1A, described in greater detail below). In the ARM architecture, EL-3 can provide support for two security states.

An exception can be generated when a processor (e.g., a processor associated with computing system 100*a*) first responds to an exceptional condition. The processor state at this time is the state that the exception is "taken from." The processor state immediately after taking the exception is the state the exception is "taken to." To return from an exception, the processor must execute an exception return instruction. The processor state when an exception return instruction is committed for execution is the state the exception "returns from." The processor state immediately after the execution of that instruction is that state the exception "returns to."

Execution can move between different exception levels only on taking an exception or on returning from an exception. For example, on taking an exception, the exception level will either increase or remain the same. The exception level cannot decrease on taking an exception (e.g., cannot move to a lower level of execution). On returning from an exception, the exception level either decreases or remains the same. The exception level cannot increase on returning from an exception (e.g., cannot move to a higher level of execution).

The exception level that execution changes to (or remains in) on taking an exception can be referred to as a target EL of the exception. In the ARM architecture, every exception type has a target EL that is either implicit in the nature of the exception or determined based on corresponding configuration bits in the system registers. An exception cannot target the EL-0 exception level (e.g., cannot target unprivileged execution).

In addition to the different exception levels EL-0-EL-3, the computing system 100*a* may additionally include various execution environments, including a non-secure execution environment (e.g., also referred to as a rich OS execution environment) and a trusted or secure execution environment. The trusted or secure execution environment may also be referred to as a trusted execution environment (TEE) (e.g., such as an ARM TrustZone execution environment, etc.). In some case, a TEE may reside in a virtual machine provided by the hypervisor, without the need for a secure monitor to exist, or may be involved in the transition of processor (e.g., CPU) control from one virtual machine, through the hypervisor and to the TEE. The rich execution environment may include the hypervisor 122 and the plurality of virtual machines 150, 160, 170. The secure execution environment may include the trusted application 105 and the TEE/trusted OS 115 (e.g., trust zone (TZ) component 115). A secure monitor 132 may operate across the various execution environments (e.g., the secure world and the non-secure world) and may be configured to control accesses to the secure execution environment (e.g., TEE/trusted OS 115.) FIG. 1B is a schematic diagram 100*b* depicting the first exception level EL-0 130 as including application and/or user space components; the second exception level EL-1 132 as including the kernel, kernel drivers, and/or VMs; the third exception level EL-2 134 as including the hypervisor and access control (AC) drivers; and the fourth exception level EL-3 136 as including the secure monitor. The exception levels are numbered (e.g., EL-0 to EL-3) such that the higher levels of privilege have higher numbers. For example, hypervisor 122 operating in EL-2 may have greater execution privileges than software applications 102 executing in EL-0.

As noted above, the Trusted Execution Environment (TEE) can be used for the safe execution of authorized security software, known as "Trusted Applications". For example, the secure world depicted in FIG. 1A can be associated with one or more trusted applications 105. The trusted applications 105 operate at the unprivileged exception level EL-0, and may be similar to one or more of the non-secure world applications 102. For example, a first instance of a particular application may execute at EL-0 of the non-secure world as a non-secure application instance 102, and a second instance of the particular application may execute at EL-0 of the secure world as a trusted application 105. The secure world and TEE can be used to provide end-to-end security by enforcing protection, confidentiality, integrity, and data access rights. Trusted applications 105 running in the secure world (e.g., executing in the TEE/ trusted OS 115 at EL-1) may have access to the full power of the device's main processor and memory, while hardware isolation protects the trusted applications 105 from the non-secure applications 102 running in the rich OS associated with HLOS VM 150. In some cases, trusted applications 105 may have limited access to the device's main processor and/or memory. Trusted applications 105 may be limited to secure resources associated with or otherwise available to the TEE/trusted OS 115. For instance, trusted applications 105 running in a VM may be limited to accessing secure resources that are associated with or available to the TEE/trusted OS 115. In some examples, a secure world hypervisor (not shown in FIG. 1A) may be associated with the TEE/trusted OS 115, and can be used to control and/or limit the access of trusted applications 105 to the device's main process, memory, resources, etc. In some examples, trusted applications 105 can have limited access to device resources where the access limitation(s) are implemented by the TEE/trusted OS 115. For example, the TEE/trusted OS 115 can isolate each trusted application of one or more trusted applications 105 from one another and from the TEE/trusted OS 115 itself.

Example TEE implementations may include, for example, ARM's OP-TEE, which supports the TrustZone security state when implemented in a processor (e.g., CPU) implementing the ARM architecture. In addition to protecting the trusted applications 105 from the non-secure applications 102, the TEE 115 can use operating system controls of the processor (e.g., CPU) with privilege level and isolation protection features (e.g., the memory management unit (MMU)) to isolate Trusted Applications. In some cases, the TEE may use cryptographic techniques to load and authenticate the trusted applications 105. Example use cases for the TEE may include electronic financial service applications, such as mobile wallets, money transfers, bill payments, peer-to-peer payments, or contactless payments, etc. These financial service applications may involve user interactions, and for these applications it can be important to guarantee "What You See Is What You Sign." This objective may be achieved by a dedicated trusted application 105 running in the TEE/secure OS 115 that takes over the control of the device display from the rich OS of HLOS VM 150 and provides a safe and trusted user interaction.

Various usage models of the exception levels can be utilized or implemented by a computing system architecture (e.g., such as the architecture of the computing system 100a). For example, a common usage model for the exception levels is EL-0: Applications; EL-1: OS kernel and associated functions (typically described as privileged); EL-2: Hypervisor; EL-3: Secure monitor. The example computing system 100a of FIG. 1A depicts an example implementation of this common usage model described above.

In some examples, a computing system can be used to provide a plurality of different virtual machines (VMs). For example, as depicted in the example of FIG. 1A, the computing system 100a can be used to provide the VMs 150, 160, 170. The VMs can execute using the shared hardware resources associated with computing system 100a but remain logically separate and distinct. For purposes of explanation, when referring herein to a virtual machine performing an operation, the operation may be initiated by code running on a virtual execution context (e.g., a virtual CPU (VCPU) context). For example, a virtual machine can have at least one virtual execution context (or VCPU), which is given time to run on a CPU by the hypervisor, and which may have its state saved by the hypervisor such that a different VCPU can be restored onto a CPU to be run. Using such a technique, a hypervisor can run multiple VCPUs (and hence VMs) on the underlying physical CPU (e.g., by letting each run for a period of time).

A first VM 150 can be provided as a VM associated with a high-level operating system (HLOS) of the computing system 100a. For example VM 150 can be associated with an HLOS such as Android or iOS (e.g., in examples where the computing system 100a is a smartphone or other mobile computing device). The remaining VMs 160, 170 can be used to provide various other functionality different than that of the HLOS associated with VM 150.

EL-0 is associated with a plurality of applications 102, which operate with unprivileged execution on the computing system 100a (e.g., based on operating at EL-0). Each application can be associated with a different one of the VMs 150, 160, 170. For instance, a respective first and second application 102 are shown as being associated with each of the VMs 150, 160, 170. The applications 102 associated with a particular VM may the same as the applications 102 associated with a different one of the VMs. The applications 102 associated with a particular VM can additionally, or alternatively, be different from the applications 102 associated with a different one of the VMs.

EL-1 is associated with a plurality of kernel and device driver instances 112. For example, a kernel and driver instance 112 is associated with each respective one of the VMs 150, 160, 170. The kernel can correspond to the HLOS of VM 150. For example, when VM 150 is associated with an Android HLOS, the kernel can be a Linux kernel. The kernel and driver instances 112 executing at EL-1 and associated with the plurality of VMs 150-170 can be the same across VMs or can be different. In some cases, the VMs can be associated with the same kernel but different drivers. For example, the HLOS VM 150 can be associated with a full set of device drivers, the VM 160 can be associated with minimal drivers, and the VM 170 can be associated with one or more protected drivers. At least one instance of a resource manager 117 can also operate at EL-1, and may be shared across the plurality of VMs 150-170. Each kernel and driver instance 112 can include a Trusted Execution Environment (TEE) communication interface 114, which can be used to provide communications between a non-secure world (in which the plurality of VMs 150-170 operate) and a secure world. As noted above, the TEE may reside in a VM (e.g., in some cases alongside other VMs).

EL-2 is associated with a hypervisor 122, which can also be referred to as a virtual machine monitor (VMM). The hypervisor 122 can be used to create and run VMs, such as the plurality of VMs 150-170 executing at EL-0. The hypervisor 122 can oversee operations relating to the virtualization of the hardware resources of the computing system 100a that is used to host the plurality of VMs 150-170 (e.g., hypervisor 122 can oversee the virtual sharing of computing system 100a resources between the plurality of VMs 150-170). The hypervisor 122 can include a Secure Monitor Call (SMC) interface 126, which can be used to provide communications (e.g., Secure Monitor Calls) with the TEE/ trusted OS 115 of the secure world.

For example, a non-secure world VM (e.g., one of the VMs 150-170) can communicate with TEE/trusted OS 115 of the secure world using the SMC routing interface 126 of hypervisor 122. In some examples, SMCs can be originated from the TEE communication interface 114 executing at EL-1 and associated with the call originating VM. For instance, in the example of FIG. 1A, an SMC associated with HLOS VM 150 as the originating VM can be originated by the TEE communication interface 114 of the EL-1 kernel and driver instance 112 corresponding to HLOS VM 150. The SMC from TEE communication interface 114 can be routing using the SMC routing interface 126, which executes at EL-2 to route the SMC on to the TEE 115 executing at EL-1 of the secure world. The SMC routing interface 126 can also be utilized in the call return path associated with an SMC callback from the TEE 115 of the secure world to the non-secure world TEE communication interface 114. In some aspects, the SMC routing interface 126 can additionally include a trust zone communication interface for communicating with TEE/trusted OS 115. The hypervisor 122 may additionally include a hypervisor message tracking interface 128, as depicted in FIG. 1A.

EL-3 is associated with a secure monitor 132 which may operate across the various execution environments (e.g., the secure world and the non-secure world) and may be configured to control accesses to the secure execution environment (e.g., TEE/trusted OS 115.) By operating at exception level EL-3, the secure monitor 132 operates at the highest exception level associated with computing system 100*a* and may have greater execution privileges than components operating at any of the lower exception levels EL-0-EL-2. The secure monitor 132 may include hardware and/or software components configured to support virtualization (e.g., to support the plurality of VMs 150-170) and/or to enable the abstraction or virtualization of computing resources. Secure monitor 132 can include any one or all of hardware monitors, specialized hardware fabricated on the chip, virtual machine monitors (VMM), monitor software running outside of a high level operation system (HLOS), and software monitors running as part of device drivers, which may be outside the HLOS, its memory management systems, and/or its allocator functions. The secure monitor 132 may operate in both the rich execution environment (e.g., non-secure world) and the trusted execution environment (e.g., secure world). In some cases, the secure monitor 132 may host the hypervisor 122 (e.g., the secure monitor 132 and the hypervisor 122 may be part of the same software).

In addition to the components depicted in FIG. 1A, the computing system 100*a* may also include various additional functional components configured to accomplish various functions described herein, such as a host operating system, a DSP operating system, library modules, software application programs, user processes, listener call contexts (e.g., listener threads), execution hardware (e.g., an application processor, DSP, etc.), input/output devices, memories, etc. In some aspects, as used herein, a "listen call" can refer to an event listener. In the context of a TEE (e.g., such as TEE 115 of FIG. 1A) and/or arbitrary destination callback invocation (ADCI), a listen call can be a VM service registration call. For instance, a VM (e.g., such as one of the VMs 150-170 of FIG. 1A) can make a call into a TEE (e.g., TEE 115) which never returns and waits to handle a request from the TEE for a VM service. For example, one of the VMs 150-170 can make a call into TEE 115. The call from the VM into TEE 115 does not return and waits to handle a future or subsequent request from the TEE 115 for a VM service of the calling VM (e.g., the particular one of VMs 150-170 that made the call into TEE 115). As noted above, a "listen call" may also be referred to as an "event listener." The event is a return from SMC which includes a request for a VM service as an extra return code.

A listener call context can refer to a VM SMC call that is waiting to handle a VM service request from the TEE (e.g., TEE 115). In an ADCI example, the listener call context can be the SMC that is in a 'sleep' state waiting for an event. The event can be an interrupt to call into the TEE (e.g., TEE 115) to handle the VM service request.

The 'sleep' state can be associated with putting the listener call context (e.g., VM SMC call) to sleep. ADCI is a protocol that can be used to return an implementation-specific SMC return code that causes the caller (e.g., the VM SMC call or listener call context) to be put to sleep until it later receives a wake event. Receiving the wake event can cause the sleeping caller to resume (e.g., wake from sleep). The wake event can be delivered as an interrupt when an implementation-specific SMC return code is returned from the TEE (e.g., TEE 115).

A callback service can refer to a VM service. For example, the callback service can be the VM service associated with a VM service request (e.g., such as the VM service request from the TEE and associated with the listener call context, as described above). In some aspects, a callback service can refer to the logic in a VM that runs and provides data (e.g., returns data) to the TEE (e.g., TEE 115) when requested by the TEE in a callback service request.

A callback service request (e.g., also referred to as a "callback request") can refer to a VM service request from the TEE (e.g., TEE 115).

In some aspects, the terms "listener" and "callback" may be used interchangeably.

As noted previously, the hypervisor 122 may be a software control program between an operating system and the secure monitor 132. The hypervisor 122 may host multiple operating systems (e.g., also referred to as guest operating systems). Each guest operating system may be associated with one or more VMs of the plurality of VMs 150-170 and may communicate with the hypervisor 122 and/or the secure monitor 132 in the same manner it would communicate with the physical hardware of computing system 100*a*. For instance, each VM of the plurality of VMs 150-170 can be viewed as a combination of hypervisor 122, secure monitor 132, and underlying hardware of computing system 100*a*. This allows each guest operating system associated with a particular VM of the plurality of VMs 150-170 to operate under the illusion of having exclusive access to the processors, peripherals, memory, I/O, etc. of the host computing system 100*a*.

The hypervisor 122 may be configured to manage memory access requests by the virtual machines 150-170. Operating systems are generally responsible for partitioning the physical memory across multiple processes. However, in systems that include a guest operating system running on top of a virtual machine 150-170, the memory allocated by the guest operating system is an intermediate physical memory rather than a true physical memory. On such systems, the hypervisor 122 is responsible for the actual allocation of the physical memory.

In some cases, the virtual machines may be software applications that execute software application programs in combination with the hypervisor 122. For example, the hypervisor 122 can be implemented based on a particular CPU architecture utilized by or associated with the underlying physical hardware of computing system 100*a*. For instance, the virtual machines implemented using hypervisor 122 can take advantage of the CPU architecture support for virtualization and running of software code at EL-1 and/or EL-0, with access to hardware resources (e.g., of the physical hardware of computing system 100a) and temporal resources mediated by the hypervisor 122. In some examples, the virtual machines can be implemented in combination with the hypervisor 122, without using emulation or with limited emulation performed by hypervisor 122. By creating and managing virtual machines (e.g., such as the plurality of VMs 150-170), the computing system 100a may create a "sandbox" (e.g., secured separation) around various features, including operating systems, applications, processes, etc. The computing system 100a may use these sandboxes to enforce access control among various features of the device.

The non-secure world and secure world execution environments may be loaded via a secure boot procedure. Generally, secure boot is a boot sequence in which each software image that is loaded and executed on the computing system 100a is authenticated and/or authorized via previously authenticated/authorized software. The boot sequence may be configured to prevent unauthorized or modified code from being run on the computing device by ensuring that each software image is checked before it is executed. The first image in the boot sequence is called the Primary Boot Loader (PBL), which is often stored in an immutable read-only memory that cannot be physically altered. The PBL authorizes each software image that is loaded and executed on the computing system 100a by cryptographically verifying digital signatures on each software image it loads. Those software images cryptographically verify the digital signatures on the next set of images that they load, and so on. This ensures that the software images have not been altered. In some examples, the PBL may be configured to load a first image and a second image, where the first image is a boot loader image and the second image is a trusted secure boot loader image. The first image may be configured to coordinate the loading of the rich execution environment (e.g., non-secure world), which may include the OS kernel and peripheral firmware images. The second image may be configured to coordinate the loading of the trusted execution environment (e.g., secure world), which may include the TEE 115 and TEE-related images. The separation and isolation of the TEE images during the loading process may improve security by shortening the chain of images that must be loaded, authorized and executed before the TEE image is operational. The second image may also configure the secure monitor 132 or other access control system to isolate memory used by the TEE 115 and/or the secure world execution environment from all other execution environments on the chip, and then execute the first image at a less-privileged exception level.

The hypervisor and VMs need to be booted up, after which a VM can make calls into a TEE from its communication driver. The TEE can then require the service from a VM. In some cases, the TEE may need to request one or more services that are provided by a VM executing in the non-secure world environment. For example, TEE 115 may need to request one or more services from a particular one of the non-secure world VMs 150, 160, or 170. Examples of VM services that may be requested by TEE 115 include, but are not limited to, Secure File System (SFS) services, Replay Protected Memory Block (RPMB) services, Secure Channel services, and/or time services, among various others.

In existing approaches to TEEs and VM services, the TEE 115 is invoked from the normal world (e.g., non-secure world) through a Secure Monitor Call (SMC). For example, the TEE 115 can be invoked by HLOS VM 150 using an SMC generated by TEE communication interface 114. The SMC can be routed to the secure world TEE 115 by the SMC routing interface 126 included in the hypervisor 122, as was described previously above.

The TEE 115 can only return (e.g., with an exception return (ERET) instruction) to the normal (non-secure) world (e.g., to the secure monitor) in response to an SMC. For instance, the TEE 115 does not initiate contact with the normal world and is configured only to communicate with the normal world via an SMC callback request that is returned synchronously in response to an SMC (SMC callback) it has received from the VM (e.g., in lieu of returning the results of the requested SMC). Additionally, a return from the TEE 115 (e.g., a return to the normal world) can only request a VM service from the caller VM associated with the return. The caller VM is the VM generating the SMC that triggers the SMC callback from TEE 115. For instance, other VMs will not be concurrently issuing SMC instructions (e.g., which are the only valid way to receive the SMC callback). The SMC results/callback response may be passed from a higher EL to a lower EL in general-purpose registers, along with the exception return to the SMC instruction issued by the VM. An exception return to a VM that was pre-empted at any other instruction would be corrupted by the unexpected change of registers.

The TEE 115 is therefore unable to initiate calls to a VM or a hypervisor of the normal world (e.g., TEE 115 cannot initiate calls to the plurality of VMs 150-170 and additionally cannot initiate calls to hypervisor 122 or the SMC routing interface 126 thereof). Based on the inability of the TEE to initiate calls to VMs or hypervisors, many approaches for implementing normal world VMs that operate in combination with a secure world TEE require all VM services to be hosted in the primary VM (e.g., such as HLOS VM 150 of FIG. 1A). For example, when multiple VMs and/or multiple VM configurations operate in the normal world, there is no mechanism for the TEE to request a VM service that is hosted in any VM other than the SMC caller VM. In these approaches, because all VM services are hosted in the primary VM, SMCs and/or SMC callbacks between the normal world and the TEE are routed through the primary VM as well.

There is a need for systems and techniques that can be used to provide SMC call initiation between a TEE and a selected VM of a plurality of VMs executing in a normal world of the same computing device. For example, there is a need for a TEE to initiate SMCs with VMs that have not transmitted an earlier SMC to the TEE. There is also a need for systems and techniques that can be used to implement VM services on VMs other than the primary VM. For example, there is a need to provide VM services hosted on some (or all) of the VMs included in a plurality of VMs executing on the same computing device as a secure world TEE.

Systems, apparatuses, processes (also referred to as methods), and computer-readable media (collectively referred to as "systems and techniques") are described herein that can be used to provide arbitrary destination callback invocations between a trusted execution environment (TEE) and one or more virtual machines (VMs) executing in a non-secure or normal world environment associated with the TEE. For example, the systems and techniques can be used to provide Secure Monitor Call (SMC) call initiation from the TEE to a respective VM of the plurality of VMs. The respective VM can be a particular VM that is associated with one or more VM resources needed at the TEE. Based on the SMC initiation from the TEE, the TEE can request VM services from any VM of the plurality of VMs. In one illustrative example, the systems and techniques can utilize an interrupt mechanism to notify a particular VM of the one or more VMs of a wake event associated with a requested resource at the TEE. For instance, the interrupt can be used to notify a particular VM (e.g., arbitrary VM of the one or more VMs) via an SMC return value. In some cases, the hypervisor (e.g., as the single entity through which the SMCs made by the VMs are routed) can monitor the SMC returned registers to identify an event destined for a same or different VM. In such cases, the hypervisor can generate an interrupt to the VM to notify the VM of the event. The VM can then use an SMC to query the hypervisor and/or TEE about the nature of the callback request.

In some aspects, a wait-queue can be utilized to arbitrate access from one or more VMs into a TEE. The wait-queue functionality can also be referred to as a "waitq" framework. A hypervisor associated with the one or more VMs can mediate and forward SMCs to the TEE. For instance, the hypervisor can forward SMCs from respective VMs of the plurality of VMs to the TEE.

In some examples, an SMC that cannot acquire TEE wait-queue aware resources is returned to sleep in the calling VM, for example via thread sleep. In some cases, this can be done by adding the SMC to a queue or waiters associated with the contended resource. Control can be passed back to the VM by the TEE returning back to the hypervisor/VM via exception return to after the SMC with a special sleep result, indicating that the SMC has been put to sleep. In some examples, the VM thread associated with the SMC can use a thread sleep facility in the VM operating system kernel to sleep, or otherwise keep track of the sleeping SMC. The thread sleep can be mediated by the hypervisor associated with routing or forwarding the SMC received from the calling VM. Subsequently, when the requested TEE resource (s) associated with the SMC are released (e.g., become available at the TEE), the VM can be notified to wake the corresponding sleeping thread and resume the earlier attempted SMC. For instance, the systems and techniques can determine that an otherwise unrelated SMC has caused the requested TEE resource(s) to be released. In some cases, the unrelated SMC may be from a same or different VM, which unblocks the resource that the earlier attempted SMC required, can return a special result (which is not a result of the unrelated SMC, but a result informing the hypervisor/ VM that a resource has become available). The unrelated call is still in progress and the recipient hypervisor/VM can call back to the TEE to allow the unrelated SMC to continue execution in the TEE. The hypervisor/VM however now knows that the earlier attempted SMC can be resumed, and can arrange for an event (interrupt) to be sent to the VM of the earlier attempted SMC so that it will know it can attempt to resume the SMC.

Based on the determination, the call can return an SMC return code configured to wake the sleeping thread at the calling VM. In one illustrative example, the call can return an SMC_WAKE return code configured to wake the sleeping thread at the calling VM. In some cases, the SMC_WAKE return code (or other SMC return code) can be handled (e.g., mediated and/or routed) by the hypervisor.

In some cases, the hypervisor can notify any VM included in the one or more VMs of an SMC_WAKE event. For example, the hypervisor can generate or otherwise transmit one or more interrupts to a Secure Channel Manager (SCM) driver associated with a respective VM of the plurality of VMs. In some examples, the systems and techniques can perform arbitrary destination callback invocation (ADCI)

based on generating and/or transmitting one or more wake events to arbitrary VMs of the plurality of events to service SMC callback requests originated by the TEE.

Figure 2:
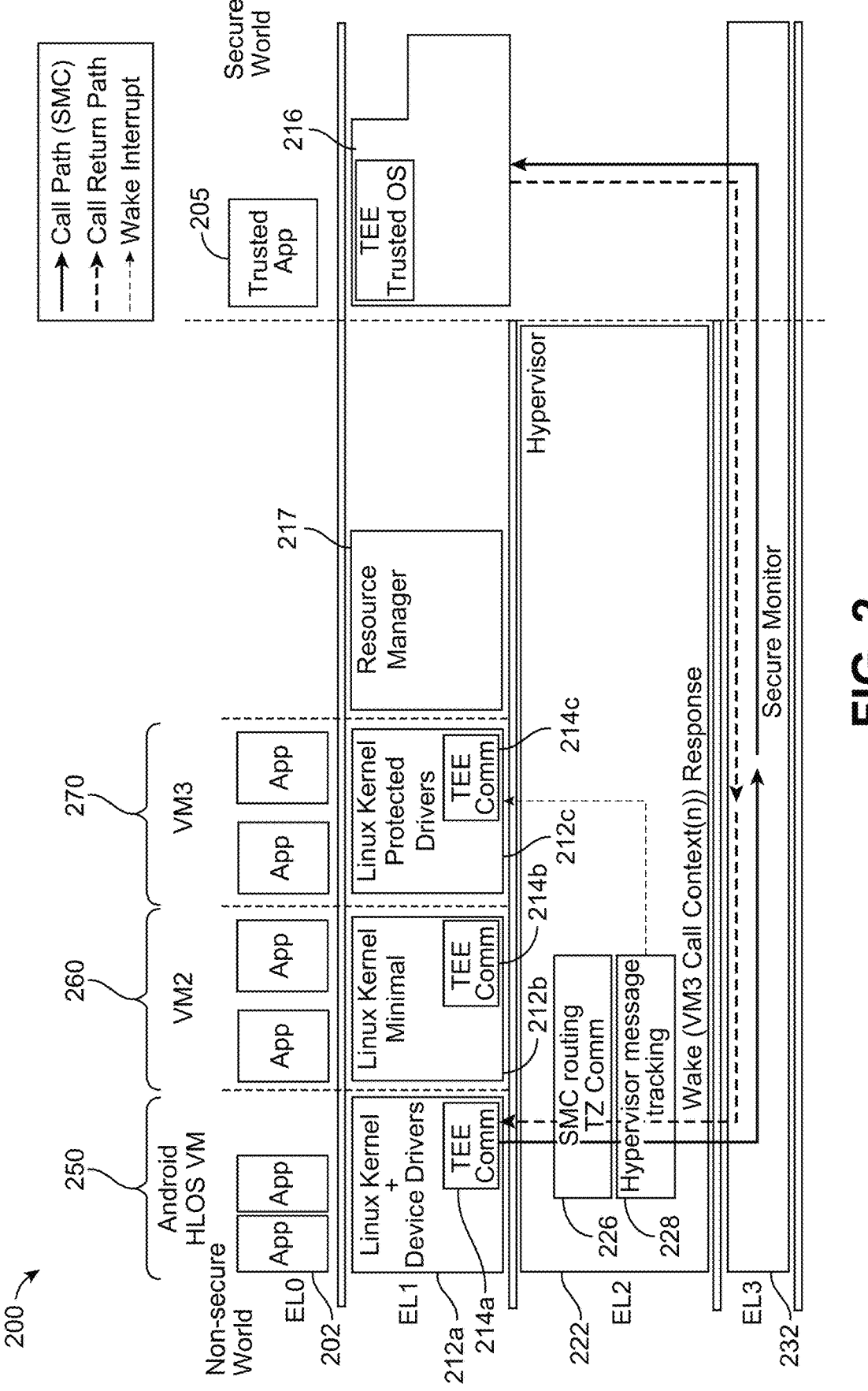
FIG. 2 is a block diagram illustrating an example of a virtual machine (VM) call waking a previously sleeping call from a different VM, in accordance with some examples.

FIG. 2 is a block diagram illustrating an example of a virtual machine (VM) call resulting in waking a previously sleeping call from a different VM, in accordance with some examples. As illustrated, a computing system 200 of FIG. 2 can be similar to the computing system 100a described above with respect to FIG. 1A. For example, the computing system 200 can include a plurality of VMs 250, 260, 270 that may be the same as or similar to the plurality of VMs 150, 160, 170 of FIG. 1A. The plurality of normal world (e.g., non-secure world) applications 202 can be the same as or similar to the plurality of normal world applications 102 of FIG. 1A The kernel and driver instances 212a, 212b, and 212c can be the same as or similar to the kernel and driver instances 112 of FIG. 1A. The resource manager 217 can be the same as or similar to the resource manager 117 of FIG. 1A. The TEE communication interfaces 214a, 214b, and 214c can be the same as or similar to the TEE communication interface 114 of FIG. 1A. The hypervisor 222 can be the same as or similar to the hypervisor 122 of FIG. 1A. The SMC routing interface 226 can be the same as or similar to the SMC routing interface 126 of FIG. 1A and/or the hypervisor message tracking interface 228 can be the same as or similar to the hypervisor message tracking interface 128 of FIG. 1A. The secure monitor 232 can be the same as or similar to the secure monitor 132 of FIG. 1A. The secure world trusted application(s) 205 can be the same as or similar to the secure world trusted application(s) 105 of FIG. 1A. The TEE/trusted OS 215 can be the same as or similar to the TEE/trusted OS 115 of FIG. 1A.

In one illustrative example, VM 250 can generate and transmit an SMC to the TEE/trusted OS 215. As described previously (e.g., with respect to FIG. 1A), the SMC from VM 250 can be generated using a TEE communication interface 214a of the kernel and device drivers instance 212a associated with VM 250 at the EL-1 exception level. The SMC can be transmitted from TEE communication interface 214a to the SMC routing and TEE communication interface 226 of hypervisor 222 and/or can be transmitted to the hypervisor message tracking interface 228 of hypervisor 222.

The hypervisor 222 can route the SMC from the normal world (e.g., non-secure execution environment) to the TEE/ trusted OS 215 of the secure world. In response to a determination that the SMC cannot acquire one or more TEE waitq-queue aware resources associated with the SMC, the SMC from VM 250 can be returned to sleep in the calling VM. As illustrated in FIG. 2, the calling VM is the HLOS VM 250. In some aspects, the SMC can be returned to sleep via thread sleep. The thread sleep can be mediated by the hypervisor 222.

In one illustrative example, the TEE 215 may determine that the SMC from VM 250 requires one or more VM resources hosted at a different VM. For example, TEE 215 may determine that the SMC from VM 250 requires the use of a VM resource hosted at VM 270. Because TEE 215 can only return to the calling domain (e.g., the calling VM 250). TEE 215 cannot return to VM 270 in order to access the needed resource at VM 270 for servicing the SMC received from VM 250.

Instead, an SMC callback request can be posted in TEE 215 for the first VM 250, and TEE 215 can transmit an SMC_WAITQ_WAKE return code to wake the first VM 250. The hypervisor 222 can receive, process, and/or route the SMC_WAITQ_WAKE return code from TEE 215. For instance, SMC routing and TEE communication interface 226 and/or hypervisor message tracking interface 228 can be used to receive, process, and/or route the SMC_WAIT-Q_WAKE return code from TEE 215 and route the wake return code to first VM 410. In one illustrative example, the SMC_WAITQ_WAKE return code can be transmitted between TEE 215 and hypervisor 222 using a call return path as indicated in FIG. 2. The hypervisor message tracking interface 228 can subsequently utilize a wake interrupt path to transmit the SMC_WAITQ_WAKE return code to the VM 270 that hosts the VM service needed for the SMC from VM 250.

Further details of the SMC callback service implemented by the systems and techniques described herein for arbitrary destination callback invocation (ADCI) by the TEE 215 will be described in greater depth below with respect to the example ADCI call flow 400 of FIG. 4.

Figure 3:
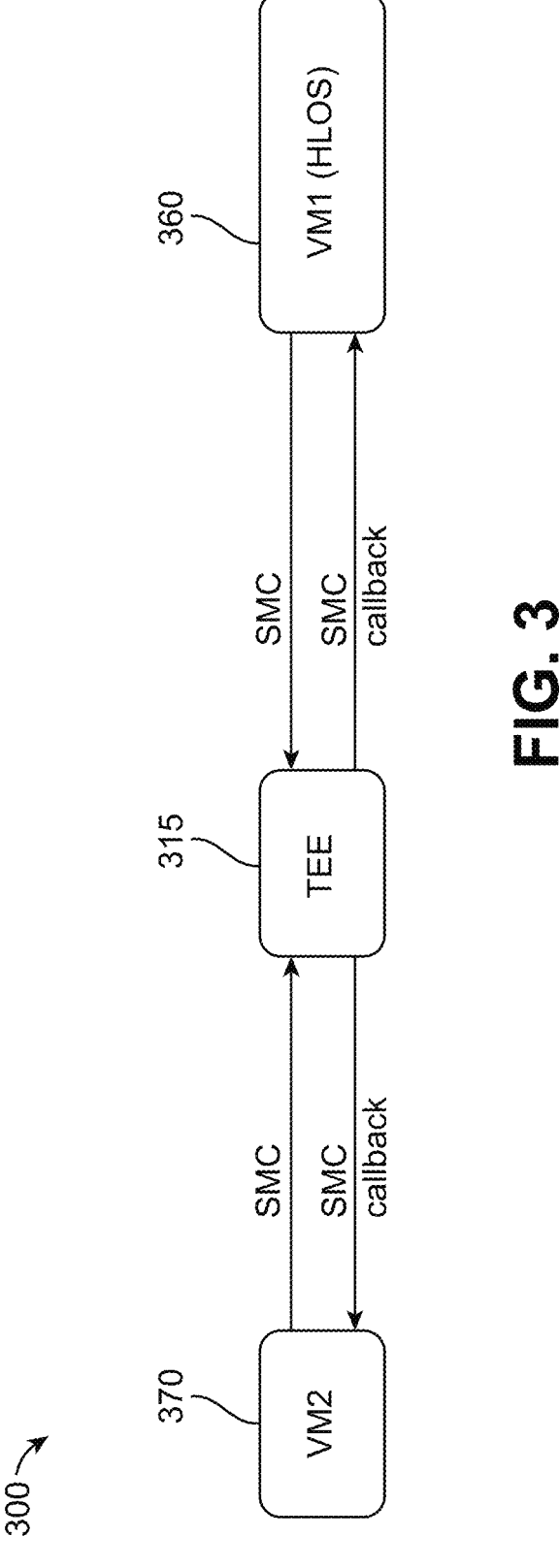
FIG. 3 is a diagram illustrating an example of Secure Monitor Calls (SMCs) and SMC callbacks transmitted between VMs and a Trusted Execution Environment (TEE), in accordance with some examples.

FIG. 3 is a diagram 300 illustrating an example of Secure Monitor Calls (SMCs) and SMC callbacks transmitted between VMs and a Trusted Execution Environment (TEE), in accordance with some examples. For instance, the systems and techniques described can leverage an existing SMC_WAITQ framework to have SMCs return and sleep in the calling VM until a corresponding wake event is received from the TEE. In one illustrative example, one or more (or all) of the VMs included in a plurality of VMs running on a computing system (e.g., such as computing system 200 of FIG. 2) can initialize the ADCI callback service described herein. For example, at initialization time, each VM hosting VM services can call in to the TEE 315 to register a respective callback service with the TEE 315 to listen for an SMC callback requesting a VM service from the respective VM.

For example, a first VM 360 can call in to the TEE 315 using an SMC to register an SMC callback service which first VM 360 can use to listen for an SMC callback from TEE 315 requesting a VM service from first VM 360. Similarly, a second VM 370 can call in to the TEE 315 using an SMC to register an SMC callback service which second VM 370 can use to listen for an SMC callback from TEE 315 requesting a VM service from second VM 370. In some aspects, the first VM 360 and the second VM 370 can use the same type of SMC message to initialize and register their respective ADCI SMC callback service with TEE 315.

The TEE 315 can subsequently determine if a service callback is pending for each VM that has initialized or registered the SMC callback service with TEE 315. For example, a pending service callback for a given VM may be posted to the TEE 315 in response to receiving an SMC from a different VM requesting a VM service hosted by the given VM (as will be explained in greater depth below with respect to the example ADCI call flow 400 of FIG. 4). If no service callback is pending for a respective VM registered with the SMC callback service, the TEE 315 will put the SMC request for the respective VM to sleep. For instance, to put an SMC request for a respective VM to sleep, the TEE 315 can return an SMC_SLEEP return code (e.g., an SMC_WAITQ_SLEEP return code). For example, the TEE 315 can return the SMC_WAITQ_SLEEP return code using the respective SMC callbacks depicted in FIG. 3 between the TEE 315 and the first and second VMs 360, 370.

When a service request is raised for a particular VM, and the particular VM has a sleeping listen call registered with the TEE 315 (e.g., the VM is one of the registered VMs of the TEE 315's SMC callback service), the TEE 315 will issue an SMC_WAKE for the particular VM. The SMC_WAKE can wake the sleeping listener call context (e.g., the sleeping listener thread) in the particular VM. In some cases, the SMC_WAKE can be an SMC_WAIT-Q_WAKE return code. A hypervisor associated with the VM(s) can issue an interrupt request (IRQ) to the particular VM, if needed to wake the VM. Subsequently, the awakened VM will issue an SMC_RESUME call (e.g., an smc_wait-q_resume call) to the TEE 315. The TEE 315 can respond to the SMC_RESUME with an SMC callback to invoke the VM service corresponding the service request previously raised for the particular VM.

Figure 4:
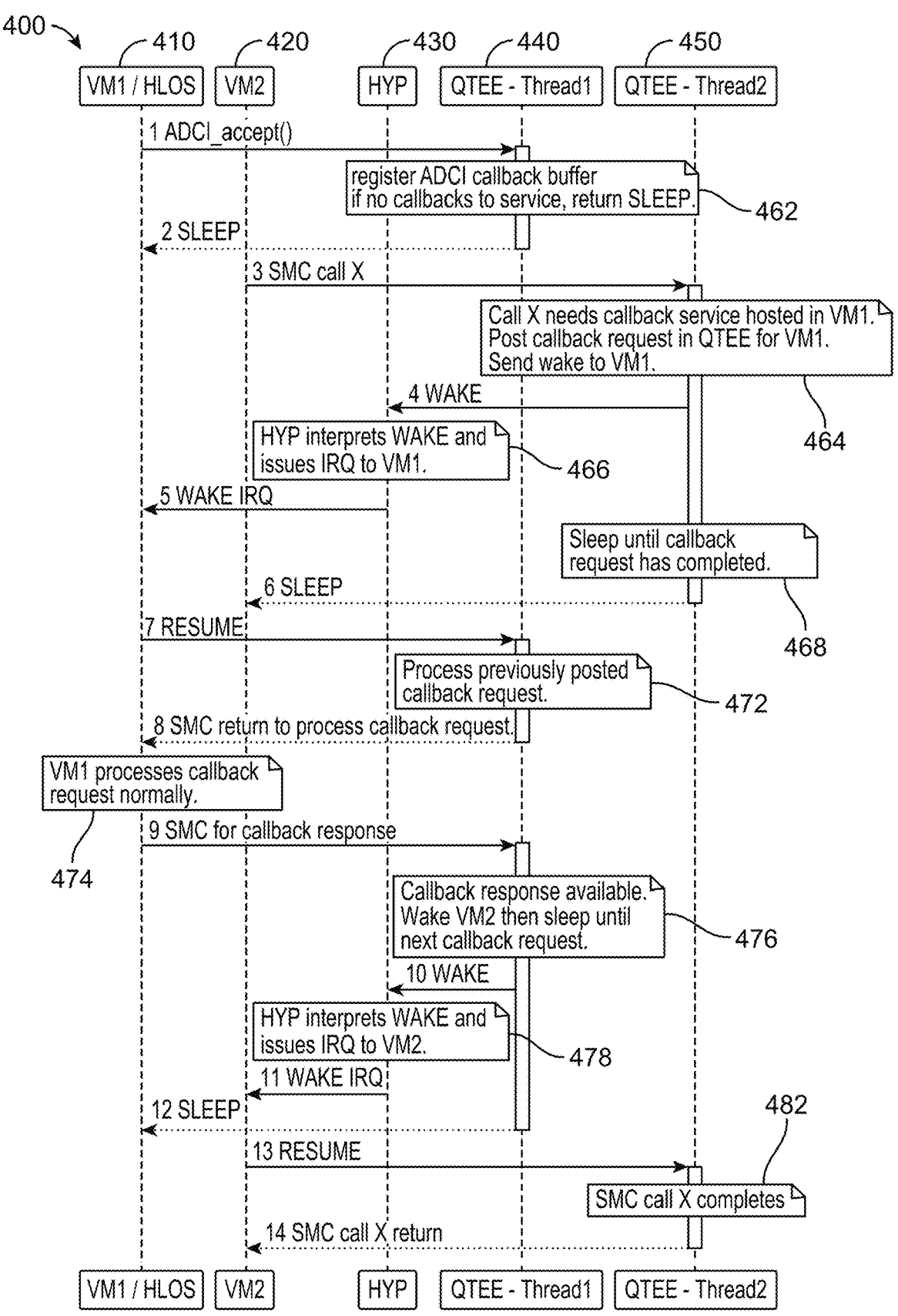
FIG. 4 is a diagram illustrating an example call flow for providing arbitrary destination callback invocations, in accordance with some examples.

FIG. 4 is a diagram illustrating an example call flow 400 for providing arbitrary destination callback invocations, in accordance with some examples. The example call flow 400 can be implemented between a first VM 410, which may be an HLOS VM (e.g., such as the HLOS VM 250 of FIG. 2); a second VM 420 (e.g., which may be the same as the VM 270 of FIG. 2); a hypervisor 430 (e.g., which may be the same as the hypervisor 222 of FIG. 2); a first TEE thread 440; and a second TEE thread 450. In some examples, the first TEE thread 440 and the second TEE thread 450 can be implemented at a TEE that is the same as or similar to the TEE 215 of FIG. 2.

In a first operation (e.g., operation 1) of the call flow 400, the HLOS VM 410 can call in to the TEE to register a callback service. For instance, VM 410 can call in to first TEE thread 440 to register an ADCI callback service. In some examples, the VM 410 can generate and transmit an ADCI_accept message to the first TEE thread 440, wherein the ADCI_accept is used to register the callback service between the first VM 410 and the first TEE thread 440. For instance, the ADCI_accept message can used to accept or register the implementation of arbitrary destination callback invocation (ADCI) between the HLOS VM 410 and the first TEE thread 440. The first TEE thread 440 can register an ADCI buffer (e.g., as depicted at 462).

In a second operation (e.g., operation 2) of the call flow 400, the first TEE thread 440 can return a sleep message or command to the HLOS VM 410. For example, the first TEE thread 440 can return the sleep message based on determining that there are no callbacks (e.g., SMC callbacks) to service. In some aspects, the sleep message returned to the HLOS VM 410 can be indicated using an SMC_WAIT-Q_SLEEP return code.

In a third operation (e.g., operation 3) of the call flow 400, the second VM 420 can generate and transmit an SMC to a second TEE thread 450. The second VM 420 can be different than the HLOS VM 410, but implemented or otherwise executed on the same computing device (e.g., such as computing system 200 of FIG. 2). The second TEE thread 450 can be different than the first TEE thread 440, but can be implemented or otherwise executed on the same TEE (e.g., such as the TEE 215 of FIG. 2).

Based on receiving the SMC X from second VM 420 in operation 3, the TEE can determine that servicing the SMC X needs a callback service hosted in a VM other than second VM 420. For instance, as depicted at 464, the TEE can determine that the SMC X from second VM 420 requires an SMC callback to a VM service hosted in HLOS VM 410. In one illustrative example, an SMC callback request can be posted in the TEE for the HLOS VM 410 (e.g., the VM identified as hosting the VM service needed for SMC X from second VM 420).

In a fourth operation (e.g., operation 4) of the call flow 400, the TEE can additionally generate and transmit a wake message to the HLOS VM 410. The wake message can be transmitted in response to the SMC X received from second VM 420 and analyzed by the TEE at operation 462. For instance, the wake message can be transmitted based on the TEE posting the callback request in the TEE for HLOS VM 410.

The wake message transmitted by the TEE to HLOS VM 410 can be mediated or otherwise routed by a hypervisor associated with the HLOS VM 410. For example, hypervisor 430 can receive and route the wake call to HLOS VM 410 (e.g., using the SMC routing and TEE communication interface 226 of FIG. 2 and/or using the hypervisor message tracking interface 228 of FIG. 2).

In a fifth operation (e.g., operation 5) of the call flow 400, the hypervisor 430 can transmit an interrupt request (IRQ) to the VM 410. For instance, hypervisor 430 can generate and transmit a WAKE IRQ message to VM 410. In some aspects, the wake message can be an SMC_WAITQ_WAKE return code that is generated and transmitted by the second TEE thread 450 (and forwarded/routed by the hypervisor 430). In some cases, the VM 410 can acknowledge the SMC_QAITQ_WAKE return code received in operation 5 by transmitting an smc_waitq_wake_ack SMC.

In one illustrative example, at 466, the hypervisor 430 can interpret the wake message and issue an interrupt request (IRQ) to the corresponding VM (e.g., VM 410). In some aspects, the hypervisor 430 can use the hypervisor message tracking interface 228 of FIG. 2 to interpret the wake message and can use the SMC routing interface 226 to route the wake message to the corresponding VM (e.g., VM 410). As indicated at 468, the corresponding thread in the TEE (e.g., which here is the second TEE thread 450) can sleep until the callback request posted in the TEE for VM 410 at operation 464 has been completed.

In a sixth operation (e.g., operation 6) of the call flow 400, the second TEE thread 450 can return a sleep message to the calling VM, which in this example is VM 420. In some aspects, the sleep message returned to the calling VM 420 can be indicated using an SMC_WAITQ_SLEEP return code.

In a seventh operation (e.g., operation 7) of the call flow 400, the VM 410 can generate and transmit to the TEE an SMC indicating that a VM resource (of VM 410) has been released or is already released. The VM resource at VM 410 that is released can be the same as the VM resource needed for the SMC X transmitted from second VM 420 to the TEE at operation 3. In some aspects, the VM 410 can transmit an smc_waitq_resume call to indicate to the TEE (e.g., to indicate to the first TEE thread 440) that the VM resource of VM 410 has been released or otherwise resumed.

In response to receiving the smc_waitq_resume SMC from VM 410, at operation 472, the first TEE thread 440 can process the previously posted SMC callback request posted in the TEE for VM1 (e.g., the SMC callback request posted in the TEE for VM1 at operation 464, based on the SMC X from VM 420).

In an eighth operation (e.g., operation 8) of the call flow 400, and based on processing the previously posted SMC callback request at operation 472, the first TEE thread 440 can generate and transmit an SMC return (e.g., callback) for the requested VM resource at the first VM 410.

At operation 474, the SMC callback return from the first TEE thread 440 (e.g., generated and transmitted at operation 8) can cause the first VM 410 to process the callback request for SMC X normally. The first VM 410 can process the SMC callback request at an operation 474, for example by using the requested VM service associated with the SMC X (from second VM 420) to process the SMC callback request.

In a ninth operation (e.g., operation 9) of the call flow 400, the first VM 410 can generate and transmit an SMC corresponding to a callback response determined at operation 474 by processing the SMC callback request using the appropriate VM service of the first VM 410. The SMC for the callback response can be transmitted from the first VM 410 to the first TEE thread 440.

At operation 476, the first TEE thread 440 can determine that an SMC callback response is available (e.g., available for the SMC callback request posted in the TEE for first VM 410 at operation 464, which is the same as the SMC callback request associated with the sleep operation 468 at second TEE thread 450. Additionally, the first TEE thread 440 can wake the second VM 420 based on determining that the SMC callback request is available. The first TEE thread 440 can wake the second VM 420 using an SMC_WAIT-Q_WAKE return code. After waking the second VM 420, the first TEE thread 440 can then sleep until the next callback request is posted in the TEE (e.g., posted for the first VM 410 and/or posted for a VM corresponding to the first TEE thread 440).

In a tenth operation (e.g., operation 10) of the call flow 400, the first TEE thread 440 can transmit the SMC_WAIT-Q_WAKE return code to the hypervisor 430. The hypervisor 430 interprets the SMC_WAITQ_WAKE return code and issues a corresponding interrupt request (IRQ) to the second VM 420 (e.g., at operation 478).

In an eleventh operation (e.g., operation 11) of the call flow 400, the hypervisor 430 generates and transmits the WAKE interrupt request to the second VM 420. The WAKE interrupt request of operation 11 can be the same as or similar to the WAKE interrupt request of operation 5 (e.g., as described previously above).

In a twelfth operation (e.g., operation 12) of the call flow 400, the first TEE thread 440 can return a sleep message to the first VM 410. In some aspects, the sleep message returned to the VM 410 can be indicated using an SMC_WAITQ_SLEEP return code (e.g., the same as or similar to the sleep message and/or SMC_WAITQ_SLEEP return code described above with respect to operation 6).

In a thirteenth operation (e.g., operation 13) of the call flow 400, the second VM 420 can generate and transmit to the second TEE thread 450 a RESUME SMC. The RESUME SMC of operation 13 can cause the second TEE thread 450 to resume processing of the SMC X transmitted by the second VM 420 at operation 3. In some cases, second VM 420 can generate and transmit the RESUME SMC as an smc_waitq_resume SMC, which may be the same as or similar to the smc_waitq_resume SMC of operation 7. In some examples, the smc_waitq_resume call can be generated by the second VM 420 based on the second VM 420 determining that the first VM 410 has completed processing of the SMC callback request. In some examples, the smc_waitq_resume call can be generated by the second VM 420 in response to the WAKE interrupt request (e.g., smc_waitq_resume) from first TEE thread/hypervisor 430 in operations 10 and 11, respectively.

After receiving the smc_waitq_resume call from second VM 420 in operation 13, the second TEE thread 450 can complete the SMC X that is associated with second VM 420 and required use of a VM resource at first VM 410. The SMC X can be completed by second TEE thread 450 at operation 482.

In a fourteenth operation (e.g., operation 14) of the call flow 400, the second TEE thread 450 can generate and transmit, to second VM 420, an SMC X return, indicative of the completed SMC X from operation 482.

FIG. 5 is a flow diagram illustrating an example of a process 500 for data access, in accordance with aspects of the present disclosure. The process 500 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 500 may be implemented as software components that are executed and run on one or more processors.

At block 502, the process 500 includes receiving a listen call from a first virtual machine (VM) of a plurality of VMs, wherein the listen call registers a listener call context of the first VM with a callback service of a trusted execution environment (TEE). For example, the plurality of VMs can be the same as or similar to one or more (or all) of the VMs 150, 160, 170 of FIG. 1A; the VMs 250, 260, 270 of FIG. 2; the VMS 360 and 370 of FIG. 3; and/or the VMs 410 and 420 of FIG. 4. In some cases, the TEE can be the same as or similar to the TEE 115 of FIG. 1A, the TEE 215 of FIG. 2, the TEE 315 of FIG. 3, and/or the TEE threads 440, 450 of FIG. 4.

In some cases, the plurality of VMs and the TEE are executed on a same computing device. The computing device can be the same as or similar to the computing system 100a of FIG. 1A, the computing system 200 of FIG. 2, and/or the computing system 600 of FIG. 6.

In some examples, the listen call can refer to an event listener. In the context of a TEE and/or arbitrary destination callback invocation (ADCI), the listen call can be a VM service registration call. For instance, a VM can make a call into a TEE which never returns and waits to handle a request from the TEE for a VM service. For example, the first VM can be the HLOS VM 250 of FIG. 2 (e.g., which can be the same as or similar to the HLOS VM 150 of FIG. 1A). The first VM 250 can make a call into TEE 215. The call from the first VM 250 into TEE 215 does not return and waits to handle a future or subsequent request from the TEE 215 for a VM service of the calling VM (e.g., the first VM 250 that made the call into TEE 215). The listen call may also be referred to as an event listener. The event is a return from SMC which includes a request for a VM service as an extra return code.

In some cases, the listen call registers a listener call context of the first VM with a callback service of TEE 215. In some examples, the listen call registers the listener call context for a VM service handler of the first VM 250 of FIG. 2. In some examples, the listener call context is a VM SMC call (e.g., from first VM 250 of FIG. 2) that is waiting to handle a VM service request from the TEE (e.g., TEE 215 of FIG. 2). In an ADCI example, the listener call context can be the SMC that is in a 'sleep' state waiting for an event. The event can be an interrupt to call into the TEE (e.g., TEE 215) to handle the VM service request.

In some cases, the callback service of the TEE can refer to a VM service. For example, the callback service can be the VM service associated with a VM service request (e.g., such as the VM service request from the TEE 215 to the first VM 250 of FIG. 2). In some aspects, a callback service can refer to the logic in a VM that runs and provides data (e.g., returns data) to the TEE (e.g., TEE 215) when requested by the TEE in a callback service request.

At block 504, the process 500 includes returning, to the first VM, a return code indicating that no callback requests are available for the first VM, wherein the return code causes the first VM to put the listener call context to sleep. For example, the return code can be returned to the listen call from the first VM (e.g., HLOS VM 250 of FIG. 2). In some cases, the return code is a Secure Monitor Call (SMC) wait-queue sleep return code. In some examples, the TEE returns the return code to the first VM based on determining that no callback requests associated with the first VM are posted in the TEE. In some cases, the return code indicating that no callback requests are available for the first VM is a Secure Monitor Call (SMC) sleep return code.

In some cases, causing the first VM to put the listener call context to sleep is associated with a 'sleep' state. The sleep state can be associated with putting the listener call context (e.g., VM SMC call) to sleep. ADCI is a protocol that can be used to return an implementation-specific SMC return code that causes the caller (e.g., the VM SMC call or listener call context associated with first VM 250 of FIG. 2) to be put to sleep until it later receives a wake event. Receiving the wake event can cause the sleeping caller to resume (e.g., wake from sleep). The wake event can be delivered as an interrupt when an implementation-specific SMC return code is returned from the TEE (e.g., TEE 215 of FIG. 2).

At block 506, the process 500 includes receiving a call from a second VM of the plurality of VMs, wherein the call from the second VM raises a service request for a VM service of the first VM. For example, the second VM can be the same as or similar to the VM 260 of FIG. 2 or the VM 270 of FIG. 2. In some cases, the first VM can be the same as or similar to the HLOS VM 410 of FIG. 4 and the second VM can be the same as or similar to the VM2 420 of FIG. 4.

In some examples, the call from the second VM comprises a Secure Monitor Call (SMC). The call from the second VM can be returned to sleep in the second VM prior to the VM service of the first VM executing. In some cases, the TEE can transmit the callback request to the first VM based on determining that the call from the second VM has been returned to sleep.

At block 508, the process 500 includes returning, to the second VM, a wake return code configured to wake the listener call context of the first VM. For example, the wake return code can be a Secure Monitor Call (SMC) wait-queue wake return code. In some cases, returning the wake return code to the second VM comprises receiving, by a hypervisor associated with the plurality of VMs, the wake return code from the TEE. For example, the hypervisor can be the same as or similar to the hypervisor 122 of FIG. 1A, which is associated with the plurality of VMS 150-170 of FIG. 1A. The hypervisor can be the same as or similar to the hypervisor 222 of FIG. 2, which is associated with the plurality of VMS 250-270 of FIG. 2. The hypervisor can be the same as or similar to the hypervisor 430 of FIG. 4, which is associated with the plurality of VMS 410 and 420 of FIG. 4.

Based on receiving, by the hypervisor, the wake return code from the TEE, the hypervisor can signal an interrupt request (IRQ) to the first VM, wherein the interrupt request wakes the listener call context of the first VM. In some cases, the hypervisor signals the IEQ to a SMC driver of the first VM or a TEE communications driver associated with the first VM. For example, the TEE communications driver can be the same as or similar to the TEE communications driver 214a associated with the first VM 250 of FIG. 2. In some cases, the SMC driver can be the same as or similar to the SMC routing and TX communications 226 of FIG. 2, associated with the first VM 250 of FIG. 2.

In some examples, the IRQ is associated with listener call context of the first VM or a TEE communications driver associated with the first VM. In some examples, waking the listener call context of the first VM causes the listener call context to resume and listen for a queued service request for the VM service of the first VM.

At block 510, the process 500 includes transmitting, to the VM service of the first VM, a callback request corresponding to the service request raised by the second VM. For example, the callback request can be received using the listener call context of the first VM. In some cases, the callback request can be transmitted to the TEE, and the TEE may forward the callback request to the VM service of the first VM. In some examples, transmitting the callback request to the TEE registers the first VM with an arbitrary destination callback invocation (ADCI) service of the TEE.

At block 512, the process 500 includes receiving, from the VM service of the first VM, a response call indicative of a callback response to the callback request. In some cases, the callback response comprises an output generated using the VM service of the first VM to process the service request raised by the second VM. In some examples, the response call from the VM service of the first VM comprises a Secure Monitor Call (SMC). In some cases, the callback request is received using the listener call context of the first VM and the callback response is generated based on processing the callback request using the VM service of the first VM. The response call indicative of the callback response can be transmitted to the TEE using the listener call context of the first VM.

The components of a device configured to perform the process 500 of FIG. 5 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 6:
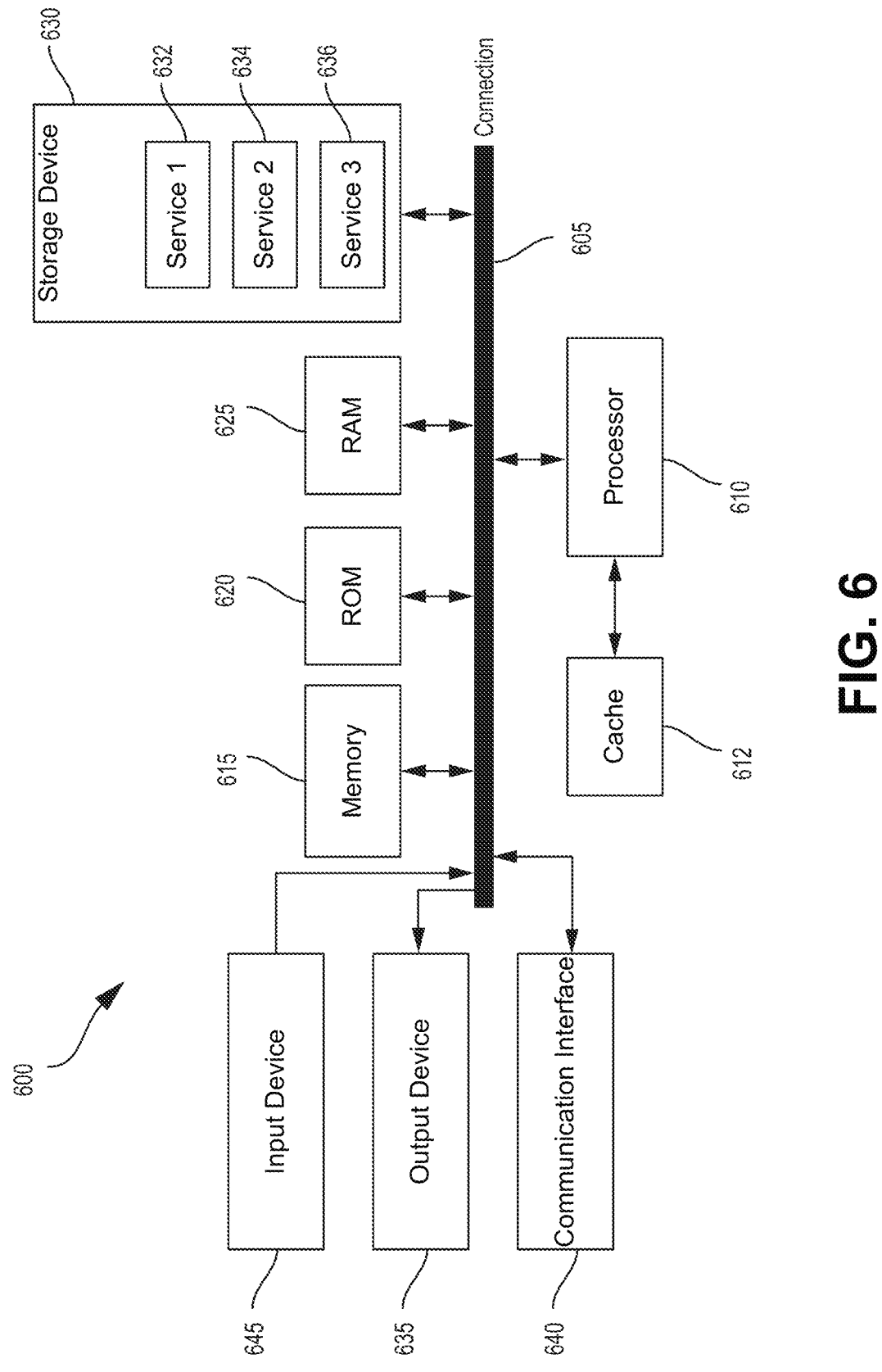
FIG. 6 is a block diagram illustrating an example of a computing system, which may be employed by the disclosed systems and techniques, in accordance with some examples.

FIG. 6 is a block diagram illustrating an example of a computing system 600, which may be employed by the disclosed systems and techniques. In particular, FIG. 6 illustrates an example of computing system 600, which can be, for example, any computing device making up internal computing system, a remote computing system, a camera, or any component thereof in which the components of the system are in communication with each other using connection 605. Connection 605 can be a physical connection using a bus, or a direct connection into processor 610, such as in a chipset architecture. Connection 605 can also be a virtual connection, networked connection, or logical connection.

In some aspects, computing system 600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 600 includes at least one processing unit (CPU or processor) 610 and connection 605 that communicatively couples various system components including system memory 615, such as read-only memory (ROM) 620 and random-access memory (RAM) 625 to processor 610. Computing system 600 can include a cache 612 of high-speed memory connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms. In some instances, multimodal systems can enable a user to provide multiple types of input/output to communicate with computing system 600.

Computing system 600 can include communications interface 640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 640 may also include one or more range sensors (e.g., LIDAR sensors, laser range finders, RF radars, ultrasonic sensors, and infrared (IR) sensors) configured to collect data and provide measurements to processor 610, whereby processor 610 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based GPS, the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 630 can include software services, servers, services, etc., that when the code that defines such software is executed by the processor 610, it causes the system to perform a function. In some aspects, a hardware service that performs a particular function can include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative aspects of the disclosure include:

Aspect 1. A method for providing access to one or more execution environments, the method comprising: receiving a listen call from a first virtual machine (VM) of a plurality of VMs, wherein the listen call registers a listener call context of the first VM with a callback service of a trusted execution environment (TEE); returning, to the first VM, a return code indicating that no callback requests are available for the first VM, wherein the return code causes the first VM to put the listener call context to sleep; receiving a call from a second VM of the plurality of VMs, wherein the call from the second VM raises a service request for a VM service of the first VM; returning, to the second VM, a wake return code configured to wake the listener call context of the first VM; transmitting, to the VM service of the first VM, a callback request corresponding to the service request raised by the second VM; and receiving, from the VM service of the first VM, a response call indicative of a callback response to the callback request.

Aspect 2. The method of Aspect 1, wherein the callback response comprises an output generated using the VM service of the first VM to process the service request raised by the second VM.

Aspect 3. The method of any of Aspects 1 to 2, wherein one or more of the call from the second VM or the response call from the VM service of the first VM comprises a Secure Monitor Call (SMC).

Aspect 4. The method of any of Aspects 1 to 3, wherein: the return code is returned to the listen call from the first VM; and the return code is a Secure Monitor call (SMC) wait-queue sleep return code.

Aspect 5. The method of any of Aspects 1 to 4, wherein the wake return code is a Secure Monitor Call (SMC) wait-queue wake return code.

Aspect 6. The method of any of Aspects 1 to 5, wherein returning the wake return code to the second VM comprises: receiving, by a hypervisor associated with the plurality of VMs, the wake return code from the TEE; and signaling, by the hypervisor, an interrupt request (IRQ) to the first VM, wherein the interrupt request wakes the listener call context of the first VM.

Aspect 7. The method of Aspect 6, wherein the hypervisor signals the IRQ to a Secure Monitor Call (SMC) driver of the first VM or a TEE communications driver associated with the first VM.

Aspect 8. The method of any of Aspects 6 to 7, wherein: the IRQ is associated with the listener call context of the first VM or a TEE communications driver associated with the first VM; and waking the listener call context of the first VM causes the listener call context to resume and listen for a queued service request for the VM service of the first VM.

Aspect 9. The method of any of Aspects 1 to 8, wherein: the callback request is received using the listener call context of the first VM; the callback response is generated based on processing the callback request using the VM service of the first VM; and the response call indicative of the callback response is transmitted to the TEE using the listener call context of the first VM.

Aspect 10. The method of any of Aspects 1 to 9, wherein the TEE returns the return code to the first VM based on determining that no callback requests associated with the VM are posted in the TEE.

Aspect 11. The method of any of Aspects 1 to 10, wherein the return code indicating that no callback requests are available for the first VM is a Secure Monitor Call (SMC) sleep return code.

Aspect 12. The method of any of Aspects 1 to 11, wherein transmitting the callback request to the TEE registers the VM with an arbitrary destination callback invocation (ADCI) service of the TEE.

Aspect 13. The method of any of Aspects 1 to 12, wherein the call from the second VM is returned to sleep in the second VM prior to the VM service of the first VM executing.

Aspect 14. The method of Aspect 13, wherein the TEE transmits the callback request to the first VM based on determining that the call from the second VM has been returned to sleep.

Aspect 15. The method of any of Aspects 1 to 14, wherein the plurality of VMs and the TEE are executed on a same computing device.

Aspect 16. The method of any of Aspects 1 to 15, wherein the listen call registers the listener call context for a VM service handler of the first VM.

Aspect 17. An apparatus for providing access to one or more execution environments, the apparatus comprising: at least one memory; and at least one processor coupled to the at least one memory and configured to: receive a listen call from a first virtual machine (VM) of a plurality of VMs, wherein the listen call registers a listener call context of the first VM with a callback service of a trusted execution environment (TEE); return, to the first VM, a return code indicating that no callback requests are available for the first VM, wherein the return code causes the first VM to put the listener call context to sleep; receive a call from a second VM of the plurality of VMs, wherein the call from the second VM raises a service request for a VM service of the first VM; return, to the second VM, a wake return code configured to wake the listener call context of the first VM; transmit, to the VM service of the first VM, a callback request corresponding to the service request raised by the second VM; and receive, from the VM service of the first VM, a response call indicative of a callback response to the callback request.

Aspect 18. The apparatus of Aspect 17, wherein the callback response comprises an output generated using the VM service of the first VM to process the service request raised by the second VM.

Aspect 19. The apparatus of any of Aspects 17 to 18, wherein one or more of the call from the second VM or the response call from the VM service of the first VM comprises a Secure Monitor Call (SMC).

Aspect 20. The apparatus of any of Aspects 17 to 19, wherein the at least one processor is configured to: return the return code to the listen call from the first VM; wherein the return code is a Secure Monitor call (SMC) wait-queue sleep return code.

Aspect 21. The apparatus of any of Aspects 17 to 20, wherein the wake return code is a Secure Monitor Call (SMC) wait-queue wake return code.

Aspect 22. The apparatus of any of Aspects 17 to 21, wherein, to return the wake return code to the second VM, the at least one processor is configured to: receive, by a hypervisor associated with the plurality of VMs, the wake return code from the TEE; and signal, by the hypervisor, an interrupt request (IRQ) to the first VM, wherein the interrupt request wakes the listener call context of the first VM.

Aspect 23. The apparatus of Aspect 22, wherein the at least one processor is configured to: signal, by the hypervisor, the IRQ to a Secure Monitor Call (SMC) driver of the first VM or a TEE communications driver associated with the first VM.

Aspect 24. The apparatus of any of Aspects 22 to 23, wherein: the IRQ is associated with the listener call context of the first VM or a TEE communications driver associated with the first VM; and to wake the listener call context of the first VM, the at least one processor is configured to cause the listener call context to resume and listen for a queued service request for the VM service of the first VM.

Aspect 25. The apparatus of any of Aspects 17 to 24, wherein the at least one processor is configured to: receive the callback request using the listener call context of the first VM; generate the callback response based on processing the callback request using the VM service of the first VM; and transmit the response call indicative of the callback response to the TEE using the listener call context of the first VM.

Aspect 26. The apparatus of any of Aspects 17 to 25, wherein the at least one processor is configured to: return, by the TEE, the return code to the first VM based on determining that no callback requests associated with the VM are posted in the TEE.

Aspect 27. The apparatus of any of Aspects 17 to 26, wherein the return code indicating that no callback requests are available for the first VM is a Secure Monitor Call (SMC) sleep return code.

Aspect 28. The apparatus of any of Aspects 17 to 27, wherein, to transmit the callback request to the TEE, the at least one processor is configured to register the VM with an arbitrary destination callback invocation (ADCI) service of the TEE.

Aspect 29. The apparatus of any of Aspects 17 to 28, wherein the at least one processor is configured to return the call from the second VM to sleep in the second VM prior to the VM service of the first VM executing.

Aspect 30. The apparatus of Aspect 29, wherein the at least one processor is configured to: transmit, by the TEE, the callback request to the first VM based on determining that the call from the second VM has been returned to sleep.

Aspect 31. The apparatus of any of Aspects 17 to 30, wherein the plurality of VMs and the TEE are executed on a same computing device.

Aspect 32. The apparatus of any of Aspects 17 to 31, wherein the listen call registers the listener call context for a VM service handler of the first VM.

Aspect 33. A non-transitory computer-readable storage medium comprising instructions stored thereon which, when executed by at least one processor, causes the at least one processor to perform operations according to any of Aspects 1 to 16.

Aspect 34. A non-transitory computer-readable storage medium comprising instructions stored thereon which, when executed by at least one processor, causes the at least one processor to perform operations according to any of Aspects 17 to 32.

Aspect 35. An apparatus comprising one or more means for performing operations according to any of Aspects 1 to 16.

Aspect 36. An apparatus comprising one or more means for performing operations according to any of Aspects 17 to 32.

What is claimed is:

1. A method for providing access to one or more execution environments, the method comprising:
   receiving a listen call from a first virtual machine (VM) of a plurality of VMs, wherein the listen call registers a listener call context of the first VM with a callback service of a trusted execution environment (TEE);
   returning, to the first VM, a return code indicating that no callback requests are available for the first VM, wherein the return code causes the first VM to put the listener call context to sleep;
   receiving a call from a second VM of the plurality of VMs, wherein the call from the second VM raises a service request for a VM service of the first VM;
   returning, to the first VM, a wake return code configured to wake the listener call context of the first VM;
   transmitting, to the VM service of the first VM, a callback request corresponding to the service request raised by the second VM; and
   receiving, from the VM service of the first VM, a response call indicative of a callback response to the callback request.

2. The method of claim 1, wherein the callback response comprises an output generated using the VM service of the first VM to process the service request raised by the second VM.

3. The method of claim 1, wherein one or more of the call from the second VM or the response call from the VM service of the first VM comprises a Secure Monitor Call (SMC).

4. The method of claim 1, wherein:
   the return code is returned to the listen call from the first VM; and
   the return code is a Secure Monitor call (SMC) wait-queue sleep return code.

5. The method of claim 1, wherein the wake return code is a Secure Monitor Call (SMC) wait-queue wake return code.

6. The method of claim 1, wherein returning the wake return code to the first VM comprises:
   receiving, by a hypervisor associated with the plurality of VMs, the wake return code from the TEE; and
   signaling, by the hypervisor, an interrupt request (IRQ) to the first VM, wherein the interrupt request wakes the listener call context of the first VM.

7. The method of claim 6, wherein the hypervisor signals the IRQ to a Secure Monitor Call (SMC) driver of the first VM or a TEE communications driver associated with the first VM.

8. The method of claim 6, wherein:

the IRQ is associated with the listener call context of the first VM or a TEE communications driver associated with the first VM; and waking the listener call context of the first VM causes the listener call context to resume and listen for a queued service request for the VM service of the first VM.

9. The method of claim 1, wherein:

the callback request is received using the listener call context of the first VM;

the callback response is generated based on processing the callback request using the VM service of the first VM; and the response call indicative of the callback response is transmitted to the TEE using the listener call context of the first VM.

10. The method of claim 1, wherein the TEE returns the return code to the first VM based on determining that no callback requests associated with the VM are posted in the TEE.

11. The method of claim 1, wherein the return code indicating that no callback requests are available for the first VM is a Secure Monitor Call (SMC) sleep return code.

12. The method of claim 1, wherein transmitting the callback request to the TEE registers the VM with an arbitrary destination callback invocation (ADCI) service of the TEE.

13. The method of claim 1, wherein the call from the second VM is returned to sleep in the second VM prior to the VM service of the first VM executing.

14. The method of claim 13, wherein the TEE transmits the callback request to the first VM based on determining that the call from the second VM has been returned to sleep.

15. The method of claim 1, wherein the plurality of VMs and the TEE are executed on a same computing device.

16. The method of claim 1, wherein the listen call registers the listener call context for a VM service handler of the first VM.

17. An apparatus for providing access to one or more execution environments, the apparatus comprising:

at least one memory; and at least one processor coupled to the at least one memory and configured to:

receive a listen call from a first virtual machine (VM) of a plurality of VMs, wherein the listen call registers a listener call context of the first VM with a callback service of a trusted execution environment (TEE);

return, to the first VM, a return code indicating that no callback requests are available for the first VM, wherein the return code causes the first VM to put the listener call context to sleep;

receive a call from a second VM of the plurality of VMs, wherein the call from the second VM raises a service request for a VM service of the first VM;

return, to the first VM, a wake return code configured to wake the listener call context of the first VM;

transmit, to the VM service of the first VM, a callback request corresponding to the service request raised by the second VM; and receive, from the VM service of the first VM, a response call indicative of a callback response to the callback request.

18. The apparatus of claim 17, wherein the callback response comprises an output generated using the VM service of the first VM to process the service request raised by the second VM.

19. The apparatus of claim 17, wherein one or more of the call from the second VM or the response call from the VM service of the first VM comprises a Secure Monitor Call (SMC).

20. The apparatus of claim 17, wherein the at least one processor is configured to:

return the return code to the listen call from the first VM;

wherein the return code is a Secure Monitor call (SMC) wait-queue sleep return code.

21. The apparatus of claim 17, wherein the wake return code is a Secure Monitor Call (SMC) wait-queue wake return code.

22. The apparatus of claim 17, wherein, to return the wake return code to the first VM, the at least one processor is configured to:

receive, by a hypervisor associated with the plurality of VMs, the wake return code from the TEE; and signal, by the hypervisor, an interrupt request (IRQ) to the first VM, wherein the interrupt request wakes the listener call context of the first VM.

23. The apparatus of claim 22, wherein the at least one processor is configured to:

signal, by the hypervisor, the IRQ to a Secure Monitor Call (SMC) driver of the first VM or a TEE communications driver associated with the first VM.

24. The apparatus of claim 22, wherein:

the IRQ is associated with the listener call context of the first VM or a TEE communications driver associated with the first VM; and to wake the listener call context of the first VM, the at least one processor is configured to cause the listener call context to resume and listen for a queued service request for the VM service of the first VM.

25. The apparatus of claim 17, wherein the at least one processor is configured to:

receive the callback request using the listener call context of the first VM;

generate the callback response based on processing the callback request using the VM service of the first VM; and transmit the response call indicative of the callback response to the TEE using the listener call context of the first VM.

26. The apparatus of claim 17, wherein the at least one processor is configured to:

return, by the TEE, the return code to the first VM based on determining that no callback requests associated with the VM are posted in the TEE.

27. The apparatus of claim 17, wherein the return code indicating that no callback requests are available for the first VM is a Secure Monitor Call (SMC) sleep return code.

28. The apparatus of claim 17, wherein, to transmit the callback request to the TEE, the at least one processor is configured to register the VM with an arbitrary destination callback invocation (ADCI) service of the TEE.

29. The apparatus of claim 17, wherein the at least one processor is configured to return the call from the second VM to sleep in the second VM prior to the VM service of the first VM executing.

30. The apparatus of claim 29, wherein the at least one processor is configured to:

transmit, by the TEE, the callback request to the first VM based on determining that the call from the second VM has been returned to sleep.

* * * * *